United States Patent
Jander et al.

(10) Patent No.: US 9,319,169 B2
(45) Date of Patent: Apr. 19, 2016

(54) ORTHOGONALLY-COMBINING INTERLEAVING FILTER MULTIPLEXER AND SYSTEMS AND METHODS USING SAME

(75) Inventors: Ralph Brian Jander, Freefold, NJ (US); Yan Jiang, Manalapan, NJ (US)

(73) Assignee: TYCO ELECTRONICS SUBSEA COMMUNICATIONS LLC, Morristown, NJ (US)

( * ) Notice: Subject to any disclaimer, the term of this patent is extended or adjusted under 35 U.S.C. 154(b) by 231 days.

(21) Appl. No.: 12/831,477

(22) Filed: Jul. 7, 2010

(65) Prior Publication Data

US 2012/0008950 A1    Jan. 12, 2012

(51) Int. Cl.
  *H04J 14/00* (2006.01)
  *H04J 14/06* (2006.01)
  *G02B 6/27* (2006.01)
  *H04J 14/02* (2006.01)

(52) U.S. Cl.
  CPC .............. *H04J 14/06* (2013.01); *G02B 6/272* (2013.01); *H04J 14/02* (2013.01); *H04J 14/0279* (2013.01)

(58) Field of Classification Search
  USPC .......................................................... 398/74
  See application file for complete search history.

(56) References Cited

U.S. PATENT DOCUMENTS

| | | | | |
|---|---|---|---|---|
| 5,680,490 A * | 10/1997 | Cohen | ............ | H04J 14/02 385/24 |
| 6,134,033 A | 10/2000 | Bergano et al. | | |
| 6,163,393 A * | 12/2000 | Wu | ............ | G02B 6/272 398/1 |
| 6,208,444 B1 * | 3/2001 | Wong | ............ | G02B 6/272 359/589 |
| 6,252,716 B1 | 6/2001 | Paiam | | |
| 6,459,515 B1 * | 10/2002 | Bergano | ............ | H04J 14/02 398/79 |
| 6,512,615 B2 * | 1/2003 | Wu | ............ | G02B 6/272 398/49 |
| 6,607,313 B1 * | 8/2003 | Farries | ............ | G02B 6/2861 398/102 |
| 6,611,340 B2 * | 8/2003 | Gu | ............ | G02B 6/272 356/491 |
| 6,614,573 B1 * | 9/2003 | Cao | ............ | G02B 6/272 359/246 |
| 6,741,810 B2 * | 5/2004 | Otani | ............ | H04J 14/08 398/43 |
| 6,781,749 B2 * | 8/2004 | Radic | ............ | G02B 6/2713 359/341.2 |
| 6,819,872 B2 * | 11/2004 | Farries | ............ | G02B 6/2861 398/102 |

(Continued)

OTHER PUBLICATIONS

Heris et al; Interleavers/Deinterleavers based on Michelson-Gires-Tournois Interferomters with different structures; 2004; IEEE; pp. 573-576.*

(Continued)

*Primary Examiner* — Ken Vanderpuye
*Assistant Examiner* — Amritbir Sandhu

(57) ABSTRACT

In general, a wavelength division multiplexed (WDM) communication system simultaneously pre-filters and combines groups of wavelengths with orthogonal polarizations to provide a pre-filtered, pair-wise orthogonal aggregate WDM optical signal. In particular, an orthogonally-combining interleaving filter multiplexer provides substantially orthogonal polarizations for odd and even channel wavelengths and simultaneously pre-filters and combines the orthogonally polarized odd and even channel wavelengths using interleaver optics. The orthogonal polarizations may be provided by orientation of PM input fibers or by a polarization rotator in the orthogonally-combining interleaving filter multiplexer.

27 Claims, 4 Drawing Sheets

(56) References Cited

U.S. PATENT DOCUMENTS

| | | | | |
|---|---|---|---|---|
| 6,904,240 B1* | 6/2005 | Suga | ............ | H04J 14/06 398/79 |
| 7,046,876 B2* | 5/2006 | Kim | ............ | G02B 6/29386 385/15 |
| 7,076,169 B2* | 7/2006 | Shpantzer | ............ | H04B 10/2543 398/152 |
| 7,110,677 B2* | 9/2006 | Reingand | ............ | H04B 10/2543 398/204 |
| 7,120,330 B2 | 10/2006 | Jander et al. | | |
| 7,154,670 B2 | 12/2006 | Zhang et al. | | |
| 8,064,768 B2* | 11/2011 | Ji | ............ | G02B 6/29335 398/79 |
| 2001/0015836 A1* | 8/2001 | Kim | ............ | H04J 14/02 398/79 |
| 2002/0186467 A1* | 12/2002 | Huang | ............ | G02B 27/283 359/484.07 |
| 2002/0186476 A1* | 12/2002 | Sasano et al. | ............ | 359/719 |
| 2003/0103265 A1* | 6/2003 | Gu | ............ | G02B 6/29302 359/484.07 |
| 2003/0197919 A1* | 10/2003 | Radic | ............ | G02B 6/2713 359/341.2 |
| 2004/0016874 A1* | 1/2004 | Rao | ............ | G06F 1/0136 250/225 |
| 2004/0202473 A1* | 10/2004 | Nakamura | ............ | H04J 14/02 398/85 |
| 2004/0247227 A1* | 12/2004 | Eder | ............ | G02B 6/12007 385/11 |
| 2007/0116468 A1* | 5/2007 | Ji | ............ | H04J 14/02 398/79 |
| 2009/0162066 A1* | 6/2009 | Ji | ............ | G02B 6/29335 398/79 |
| 2009/0214214 A1 | 8/2009 | Mohs et al. | | |
| 2010/0067401 A1* | 3/2010 | Medvedev | ............ | H04L 1/0002 370/253 |
| 2010/0322627 A1* | 12/2010 | Desbruslais | ............ | G02B 6/274 398/65 |
| 2011/0150478 A1* | 6/2011 | Winzer | ............ | H04B 10/6971 398/65 |
| 2012/0087657 A1* | 4/2012 | Jander | ............ | H04J 14/02 398/48 |
| 2012/0321247 A1* | 12/2012 | Kelly | ............ | G02B 5/0236 385/31 |
| 2013/0129361 A1* | 5/2013 | Hsiao | ............ | H04J 14/02 398/183 |
| 2014/0093244 A1* | 4/2014 | Zheng | ............ | H01S 5/4062 398/72 |
| 2015/0172040 A1* | 6/2015 | Pelekaty | ............ | H04J 14/02 398/79 |

OTHER PUBLICATIONS

Chen, et al., "Interleaver Technology: Comparisons and Applications Requirements," OFC'03 Interleaver Workshop Review Paper; Formal Submission, JND ver 3.0, Jun. 25, 2003, revised Sep. 15, 2003 (9 pages).

Chiba, et al., "Waveguide Interleaver Filters," Proceedings of SPIE vol. 5246 (2003) pp. 532-538.

\* cited by examiner

ORTHOGONALLY-COMBINING INTERLEAVING FILTER MULTIPLEXER AND SYSTEMS AND METHODS USING SAME

TECHNICAL FIELD

The present application relates to the optical transmission of information and more particularly, to an orthogonally-combining interleaving filter multiplexer for use in an optical communication system and method.

BACKGROUND

Optical communication systems employ wavelength combining techniques known as wavelength division multiplexing (WDM) to multiplex many transmission channels onto a single-mode fiber. Non-linear transmission effects in optical fibers, however, may cause interactions between adjacent optical channels, which limit performance of such systems. One way to reduce these cross-channel interactions is by multiplexing the channel wavelengths such that the adjacent frequencies in the channel spectrum propagate along the transmission fiber with orthogonal states of polarization. To launch orthogonal WDM signals, existing systems often use polarization maintaining (PM) components or use complex polarization control techniques when PM components are not commercially available or viable. As PM components become more available, such components enable practical implementations of orthogonal launch of WDM signals without complex polarization control.

Other techniques may also be used to avoid crosstalk penalty in dense wavelength division multiplexed (DWDM) systems having high spectral efficiencies. One such technique involves pre-filtering the individual data spectra prior to multiplexing the channel wavelengths onto a transmission fiber. In orthogonally launched DWDM systems, however, providing both pre-filtering and orthogonal launch presents unique challenges particularly when PM components are used. Using separate PM comb filters to pre-filter the separate groups of wavelengths to be orthogonally combined, for example, may degrade system performance because of difficulties aligning the frequency and pass-band shape of multiple PM comb filters on the transmit side and an interleaver on the receive side to the data channels. These problems associated with controlling the filter shapes and center frequency alignment are compounded in systems with several groups or bands of wavelengths being multiplexed together and thus having many filters. Moreover, using additional PM components may degrade system performance because of the polarization crosstalk effect that results within PM devices and connectors from the stress in the ferrules and arrays that hold PM fibers inside of PM devices.

BRIEF DESCRIPTION OF THE DRAWINGS

Reference should be made to the following detailed description which should be read in conjunction with the following figures, wherein like numerals represent like parts.

DETAILED DESCRIPTION

In general, a wavelength division multiplexed (WDM) communication system, consistent with embodiments describe herein, simultaneously pre-filters and combines groups of channel wavelengths with orthogonal polarizations to provide a pre-filtered, pair-wise orthogonal aggregate WDM optical signal. In particular, an orthogonally-combining interleaving filter multiplexer provides substantially orthogonal polarizations for odd and even channels and simultaneously pre-filters and combines the orthogonally polarized odd and even channels using interleaver optics. The orthogonal polarizations may be provided by orientation of PM input fibers or by a polarization rotator in the orthogonally-combining interleaving filter multiplexer.

As used herein, substantially orthogonal polarization refers to an angle between polarization states of about 90°, which may include an acceptable deviation with negligible impact on performance of the WDM system. In one example, the angle between polarization states may be sufficiently close to 90° to provide a polarization extinction ratio associated with the pair-wise orthogonal WDM optical signal of less than about −18 dB (e.g., an angle of 90°±7°. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

Figure 1:
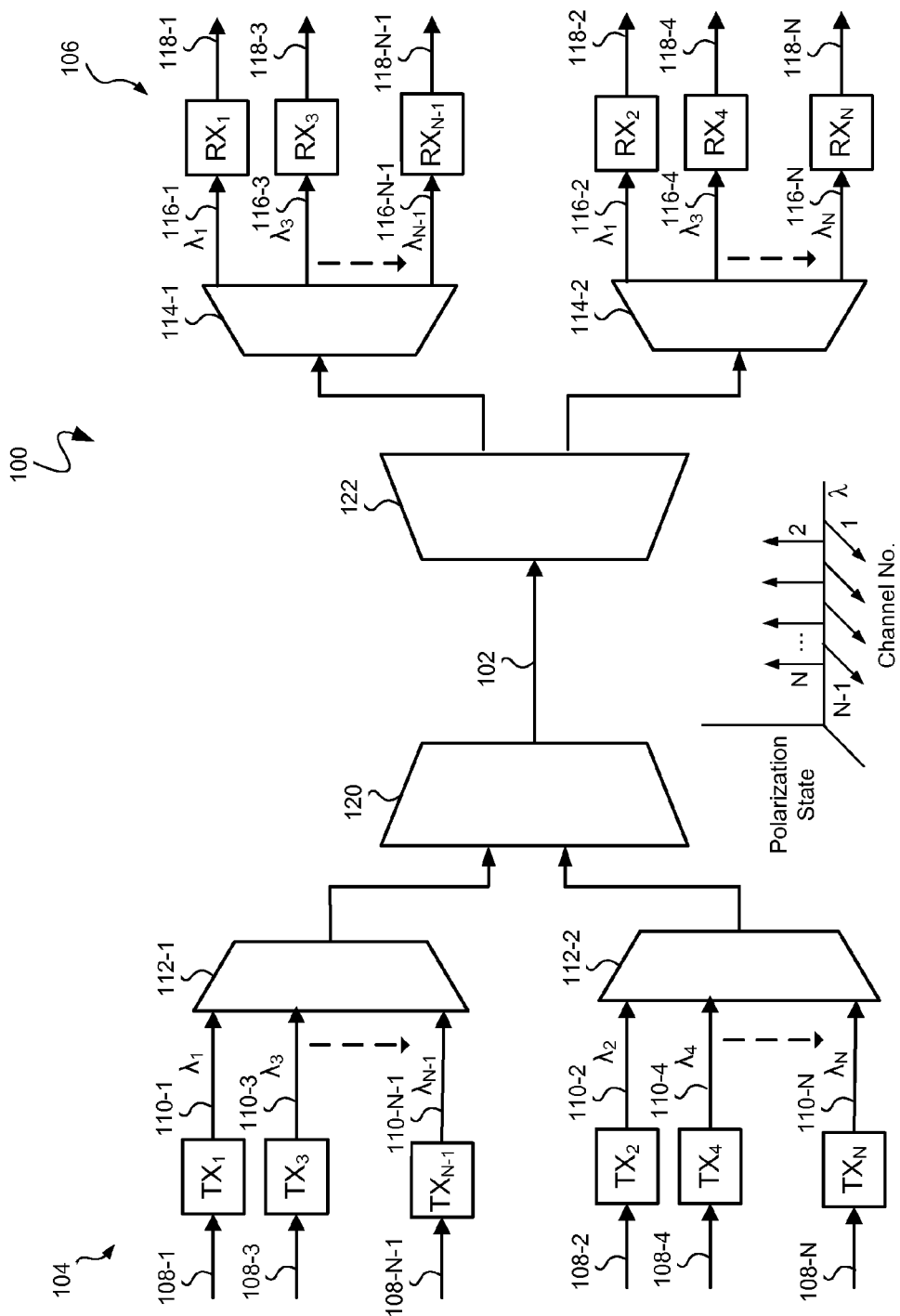
FIG. 1 is a simplified block diagram of one exemplary embodiment of a wavelength division multiplexed (WDM) communication system consistent with the present disclosure.

FIG. 1 is a simplified block diagram of one exemplary embodiment of a WDM communication system 100, consistent with the present disclosure, that simultaneously pre-filters and combines first and second sets of channels with substantially orthogonal polarizations. The communication system 100 serves to transmit a plurality of optical channels over an optical path 102 from a transmitting terminal 104 to one or more remotely located receiving terminals 106. The optical channels (1, 2, . . . N) may be established based on a plurality of corresponding optical carrier wavelengths ($\lambda_1$, $\lambda_2 \ldots \lambda_N$) such that each channel has a spectral width centered on the respective carrier wavelength (or frequency). As used herein, channel wavelengths refer to the wavelengths associated with the respective channels and may include a band of wavelengths centered on the carrier wavelength associate with a channel. For example, odd channel wavelengths may include the bands of wavelengths associated with odd channels (1, 3, . . . N−1) and even channel wavelengths may include the bands of wavelengths associated with even channels (2, 4, . . . N). Although the exemplary embodiments described herein refer to odd and even channels, other groupings of channels (with corresponding sets of channel wavelengths) may be possible with transmitters, receivers, multiplexers, demultiplexers and other components configured for those other groupings of channels.

In the exemplary embodiment, the WDM communication system 100 is a dense wavelength division multiplexed (DWDM) system having high spectral efficiencies, i.e., where the spectral width of constituent wavelength (frequency) carriers is larger than the actual frequency spacing among constituents. In exemplary embodiments, the channels (1, 2, ... N) may have a spacing of 33 GHz or 25 GHz and the spectral efficiency may be 0.6 bit/s/Hz or 0.8 bit/s/Hz.

The exemplary system 100 may be a long-haul submarine system configured for transmitting the channels from a transmitter to a receiver, for example, at a distance of 5,000 km, or more. An orthogonally-combining interleaving filter multiplexer, consistent with the present disclosure, may also be used in other systems such as terrestrial systems configured for transmitting from a transmitter to a receiver, for example, at distances in a range of about 2,000 km to 3,000 km.

Those skilled in the art will recognize that the communication system 100 has been depicted as a highly simplified point-to-point system for ease of explanation. For example, the transmitting terminal 104 and receiving terminal 106 may both be configured as transceivers or transponders, whereby each may be configured to perform both transmitting and receiving functions. For ease of explanation, however, the terminals are depicted and described herein with respect to only a transmitting or receiving function. The orthogonally-combining interleaving filter multiplexer consistent with the disclosure may be incorporated into a wide variety of network components and configurations. The illustrated exemplary embodiments herein are provided only by way of explanation, not of limitation.

In the illustrated exemplary embodiment, a plurality of odd channel transmitters $TX_1, TX_3 \ldots TX_{N-1}$ receive data on respective data paths 108-1, 108-3 ... 108-N–1 and transmit respective optical signals by modulating the data on respective optical carrier wavelengths $\lambda_1, \lambda_3 \ldots \lambda_{N-1}$ associated with odd numbered channels (i.e., 1, 3, ... N–1). Data may be modulated on the odd channel wavelengths $\lambda_1, \lambda_3 \ldots \lambda_N$ using various modulation formats such as a differential phase shift keying (DPSK) modulation format, e.g. a RZ-DPSK or CRZ-DPSK format. Similarly, each of a plurality of even channel transmitters $TX_2, TX_4 \ldots TX_N$ receive data on respective data paths 108-2, 108-4 ... 108-N and transmit respective optical signals by modulating the data on optical carrier wavelengths $\lambda_2, \lambda_4 \ldots \lambda_N$ associated with even numbered channels (i.e., 2, 4, ... N). The transmitters are shown in highly simplified form for ease of explanation. Each transmitter may include electrical and optical components configured for transmitting the optical signal at its associated wavelength with a desired amplitude and modulation.

The transmitted odd channel wavelengths are respectively carried on a plurality of optical paths 110-1, 110-3 ... 110-N-1 and the even channel wavelengths are respectively carried on a plurality of optical paths 110-2, 110-4 ... 110-N. In one embodiment, the transmitters $TX_1, TX_2, \ldots TX_N$ impart a large degree of polarization to the optical signals and the optical paths 110-1 to 110-N include polarization maintaining (PM) fibers. PM fibers maintain the polarization of the optical signals launched into the fibers such that the light propagates primarily along one of the two principal axes of the PM fiber (e.g., the slow axis). Thus, the optical signals propagate in the PM fibers with a predominantly single polarization state. Examples of PM fibers include panda style PM fibers and bow-tie style PM fibers.

An odd channel multiplexer 112-1 combines the odd channel wavelengths and an even channel multiplexer 112-2 combines the even channel wavelengths. The transmitted optical signals modulated on the odd channel wavelengths are thus combined to form an aggregate odd channel optical signal and the transmitted optical signals modulated on the even channel optical wavelengths are combined to form an aggregate even channel optical signal. In one exemplary embodiment, the channel spacing between the combined odd channels may be 66.6 Hz or 50 Hz and the channel spacing between the combined even channels may be 66.6 Hz or 50 Hz. In the exemplary embodiment, the multiplexers 112-1, 112-2 (also referred to as combiners) are PM multiplexers that also maintain the polarization of the optical signals as they are combined. One example of PM optical multiplexers or combiners includes arrayed waveguide grating (AWG) devices. The PM devices used in the system may maintain a relatively high polarization extinction ratio (e.g., greater than 18 dB).

An orthogonally-combining interleaving filter multiplexer 120 then simultaneously pre-filters and combines the aggregate signal of odd channel wavelengths and the aggregate signal of even channel wavelengths with substantially orthogonal polarizations to provide a pre-filtered, pair-wise orthogonal aggregate WDM signal on the optical path 102. The orthogonally-combining interleaving filter multiplexer 120 pre-filters the aggregate signals to truncate the individual data spectra associated with each of the channels consistent with a pass-band shape of the filter. The orthogonally-combining interleaving filter multiplexer 120 may include interleaver optics, as described in greater detail below, with a pass-band shape and frequency aligned to the individual data spectra. The pass-band shape may depend on the spectral efficiency and channel spacing of the system.

The pre-filtered, pair-wise orthogonal aggregate WDM signal may then be launched onto optical path 102. The optical path 102 may include optical fibers, waveguides, optical amplifiers, optical filters, dispersion compensating modules, and other active and passive components.

The pair-wise orthogonal aggregate WDM signal may be received at one or more remote receiving terminals 106. A deinterleaver 122 splits the WDM signal into an aggregate optical signal including odd channel wavelengths and an aggregate optical signal including even channel wavelengths. The deinterleaver 122 on the receive side may include interleaver optics with a pass-band shape and frequency alignment that matches the orthogonally-combining interleaving filter multiplexer 120 on the transmit side. Thus, the deinterleaver 122 on the receive side may filter the individual carrier spectra as the pair-wise orthogonal aggregate WDM signal is split to provide crosstalk rejection. A broadband coupler may also be used to separate the groups of odd and even channel wavelengths.

An odd channel demultiplexer 114-1 separates the transmitted odd channels at odd channel wavelengths $\lambda_1, \lambda_3 \ldots \lambda_N$ onto associated paths 116-1, 116-3 ... 116-N coupled to associated odd channel receivers $RX_1, RX_3 \ldots RX_{N-1}$. An even channel demultiplexer 114-2 separates the transmitted even channels at even channel wavelengths $\lambda_2, \lambda_4 \ldots \lambda_N$ onto associated paths 116-2, 116-4 ... 116-N coupled to associated even channel receivers $RX_2, RX_4 \ldots RX_N$. The receivers $RX_1, RX_2 \ldots RX_N$ may be configured to demodulate the optical signals on the separated channels and provide associated output data signals on respective output data paths 118-1, 118-2 ... 118-N. Each receiver may include electrical and optical components configured for receiving and demodulating the optical signal at its associated wavelength.

Figure 2:
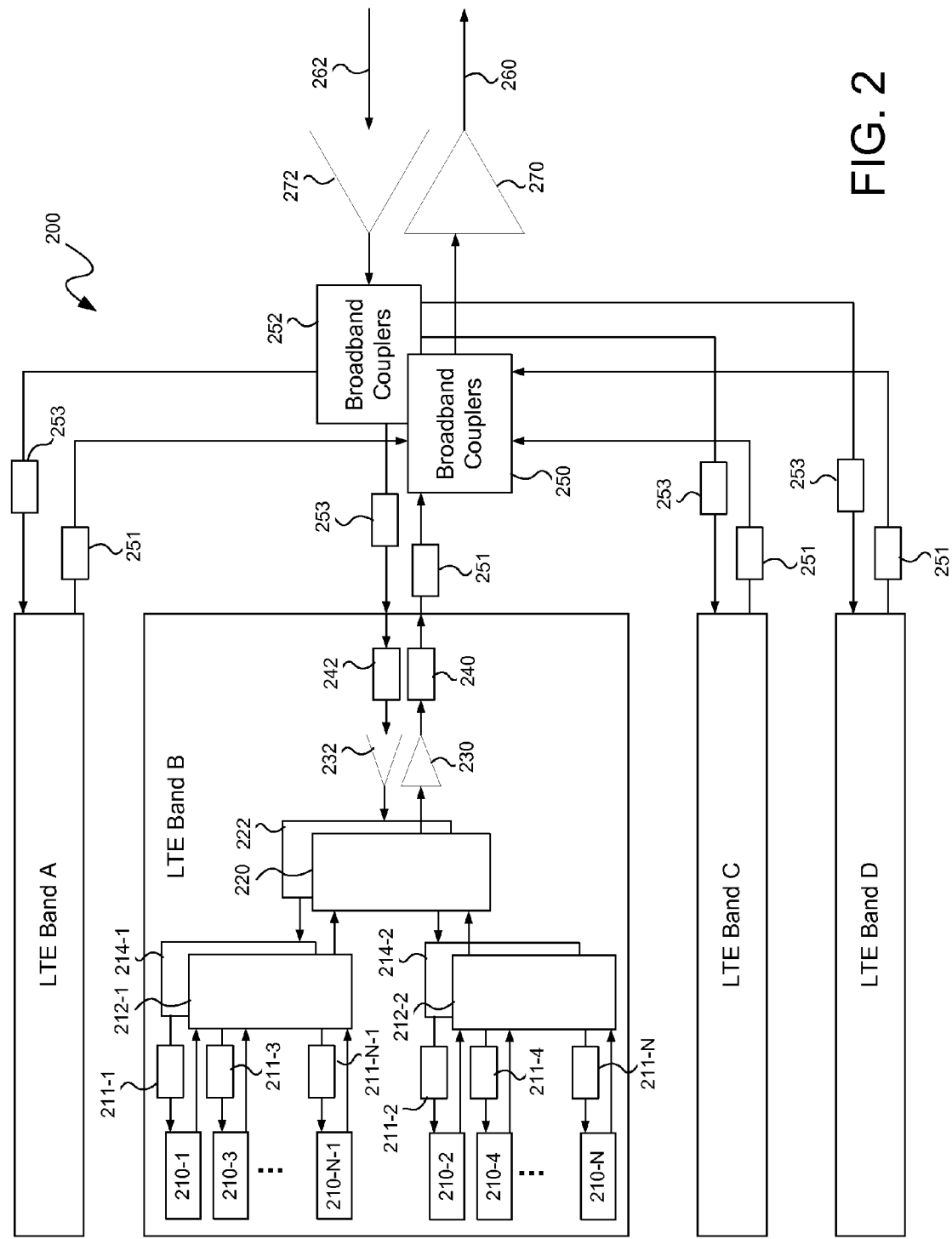
FIG. 2 is a simplified block diagram of one exemplary embodiment of line terminating equipment (LTE) consistent with the present disclosure.

FIG. 2 is a simplified block diagram of exemplary line terminating equipment (LTE) 200, consistent with the present disclosure, that simultaneously pre-filters and combines first and second sets of channel wavelengths with substantially orthogonal polarizations. In general, the LTE 200 includes equipment for both transmitting and receiving WDM signals. In particular, the LTE 200 includes odd channel transponders 210-1, 210-3 ... 210-N-1 and even channel transponders 210-2, 210-4 ... 210-N, which combine the transmitter and receiver functionality. The transponders may be grouped together in bands (e.g., shown as LTE Band A to LTE Band D). In one example, each band provides 32 channels—16 odd channels and 16 even channels. The number of LTE bands may range from, for example, 1 to 6, depending upon the desired system bandwidth (i.e., channel capacity) and channel spacing.

The LTE 200 provides wavelength division multiplexing and demultiplexing of the channel wavelengths associated with the transponders in each band. On the transmit side, an odd channel wavelength multiplexer 212-1 (or combiner) and an even channel wavelength multiplexer 212-2 (or combiner) receive optical signals from the transponders and combine the odd channel wavelengths and the even channel wavelengths, respectively, to provide aggregate optical signals. On the receive side, an odd channel wavelength demultiplexer 214-1 and an even channel wavelength demultiplexer 214-2 separate the odd channel wavelengths and the even channel wavelengths, respectively, for processing the odd channel and even channel optical signals in the transponders. The multiplexers 212-1, 212-2 and demultiplexers 214-1, 214-2 may include AWG devices such as 16×1 AWG devices to provide multiplexing and/or demultiplexing for 16 channels. Tunable dispersion compensation (TDC) devices 211-1, 211-2 ... 211-N may also be located in the receive paths before the receiver portion of each of the transponders to provide per channel dispersion compensation.

The LTE 200 further combines and separates the group of odd channel wavelengths and the group of even channel wavelengths. On the transmit side, an orthogonally-combining interleaving filter multiplexer 220 simultaneously pre-filters and combines the aggregate odd channel signal and the aggregate even channel signal with substantially orthogonal polarization to provide a pre-filtered, pair-wise orthogonal aggregate WDM signal. On the receive side, a deinterleaver 222 separates the odd channel wavelengths from the even channel wavelengths. The transmit side and receive side within each band of the LTE 200 may further include terminal line amplifiers 230, 232 and bulk dispersion compensation equipment 240, 242.

The LTE 200 may further include broadband optical couplers 250, 252 for combining the aggregate WDM signals associated with each band for transmission over an optical path 260 and for separating the WDM signal received on an optical path 262 into aggregate WDM signals associated with each band. The LTE 200 may further include group filters 251, 253 to reduce noise and terminal line amplifiers (TLA) 270, 272 for amplifying the WDM signal before transmission over the optical path 260 and for amplifying the WDM signal received on the optical path 262.

Figure 3:
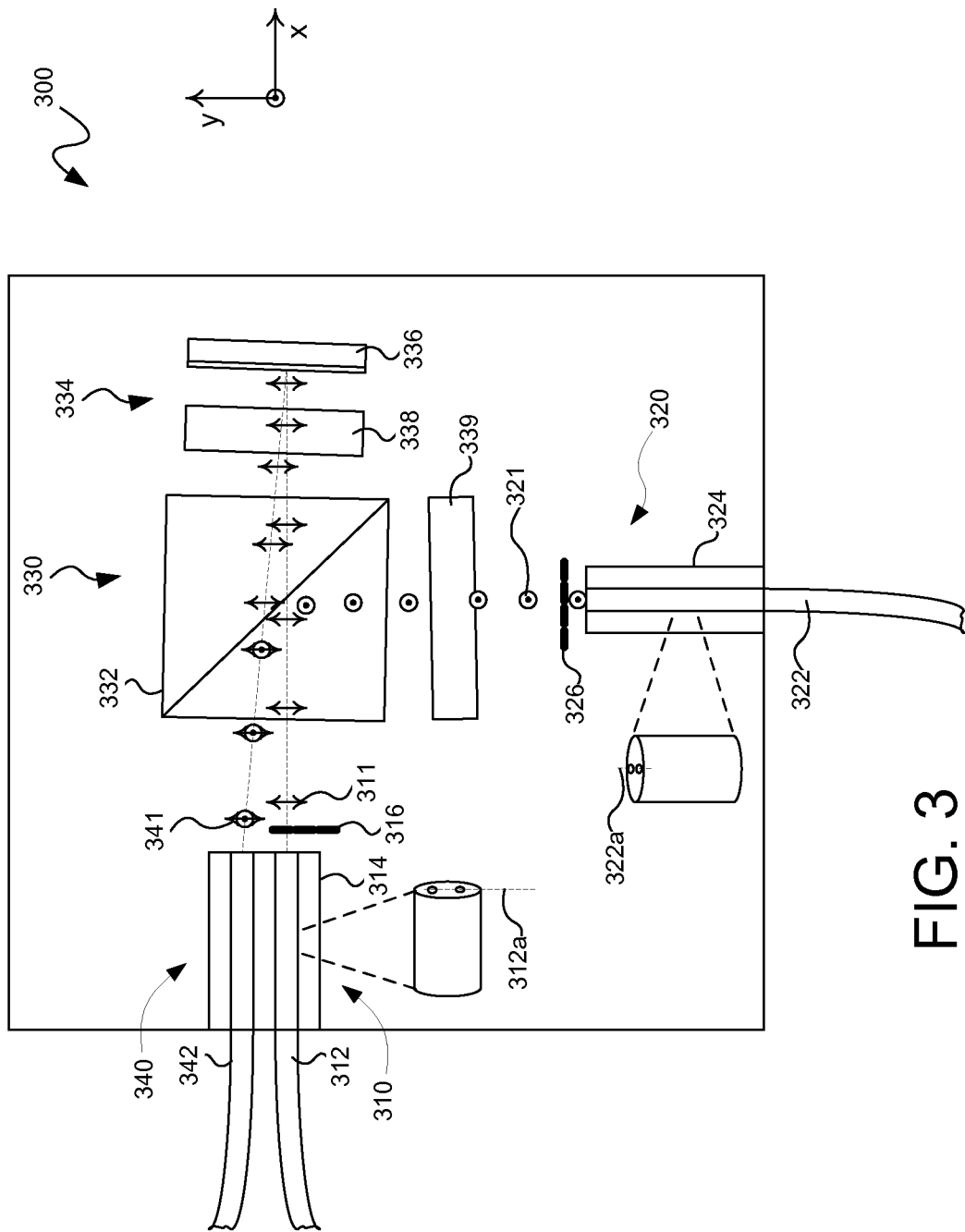
FIG. 3 is a simplified block diagram of one exemplary embodiment of an orthogonally-combining interleaving filter multiplexer consistent with the present disclosure.

Referring to FIG. 3, one embodiment of an orthogonally-combining interleaving filter multiplexer 300 is shown and described in greater detail. The orthogonally-combining interleaving filter multiplexer 300 includes polarization maintaining first and second optical inputs 310, 320 that receive combined odd channel wavelengths and combined even channel wavelengths, respectively. The orthogonally-combining interleaving filter multiplexer 300 also includes interleaver optics 330 for simultaneously pre-filtering and combining the odd channel wavelengths and the even channel wavelengths and a combined channel optical output 340 for providing pre-filtered, pair-wise orthogonal aggregate channel wavelengths.

As shown, the light 311 (e.g., the combined odd channel wavelengths) arriving from the first optical input 310 has a first polarization relative to the interleaver optics 330 (i.e., substantially parallel to the x-y plane) and the light 321 (i.e., the combined even channel wavelengths) arriving from the second optical input 320 has a second polarization (i.e., substantially perpendicular to the x-y plane) that is substantially orthogonal to the first polarization. The combined light 341 entering the combined channel output 340 includes both the light 311 with the first polarization and the light 321 with the second polarization. Although the exemplary embodiment is described and shown with the optical inputs 310, 320 assigned to odd channels and even channels, respectively, the optical input 310 may receive the even channel wavelengths and the optical input 320 may receive the odd channel wavelengths. Also, the optical inputs 310, 320 may receive different sets of channel wavelengths having groupings (e.g., other than odd and even).

In the exemplary embodiment, the optical inputs 310, 320 include input fibers 312, 322 coupled to fiber collimators 314, 324. The fiber collimator 314 may be a dual fiber collimator that is also coupled to an output fiber 342 and the fiber collimator 324 may be a single fiber collimator. The input fibers 312, 322 may be PM fibers with light traveling predominantly along one axis (e.g., along a slow axis) and aligned relative to a plane of the interleaver optics 330 (i.e., the x-y plane). As shown in the illustrated embodiment, for example, a slow axis 312a, 322a that intersects the two stress rods of panda-style PM fibers 312, 322 may be aligned relative to the x-y plane. Although the enlarged portion of the PM fibers 312, 322 shows panda-style PM fibers, other types of PM fibers may also be used and other axes (e.g., the fast axis) may also be used to provide alignment. The output fiber 342 may also be a PM fiber aligned relative to the x-y plane.

In the illustrated embodiment, orthogonal polarization between odd and even wavelengths is achieved in the optical inputs 310, 320 by rotating the PM fibers 312, 322 about 90° relative to each other. For example, the slow axis 312a of the PM input fiber 312 may be substantially parallel to the x-y plane and the slow axis 322a of the PM input fiber 322 may be substantially perpendicular to the x-y plane. The light 311, 321 that is propagating along the slow axes 312a, 322a of the respective PM input fibers 312, 322 will thus be substantially orthogonal after exiting the PM input fibers 312, 322. Providing the orthogonal polarization by rotating one of the PM input fibers 312, 322 may be advantageous when the space within the multiplexer 300 is limited and/or when deterioration (e.g., insertion loss) may be caused by using other devices to change the polarization.

The optical inputs 310, 320 may also include input polarizers 316, 326 for increasing the extinction ratio of the light 311, 321 exiting the optical inputs 310, 320 (e.g., an extinction ratio of greater than 30 dB). In one embodiment where light propagates predominantly along the slow axis, the input polarizers 316, 326 are aligned with the slow axis of the respective PM input fibers 312, 322 to remove unwanted power in the fast axis. In other embodiments, the light may be propagating predominantly along another axis (e.g., the fast axis) of the PM input fibers and the input polarizers may be aligned with that axis.

In the illustrated embodiment, the input polarizers 316, 326 are located after the collimators 314, 324 in the paths of the optical inputs 310, 320. Using input polarizers 316, 326 after the collimators 314, 324 may be advantageous to overcome extinction ratio degrading problems that may occur within the collimators 314, 324 (e.g., from a poor splice or from stress effects within the collimator subassemblies) and to increase the polarization extinction ratio just prior to interleaving. In other embodiments, in-line polarizers (not shown) may be spliced into the PM input fibers 312, 322. Using in-line polarizers may be advantageous when the space is limited after the collimators 314, 324.

The interleaver optics 330 pre-filter the odd and even channel wavelengths by truncating the individual carrier spectra associated with the channels consistent with the pass-band shape of the interleaver optics 330. In one embodiment, the interleaver optics 330 are Gires-Tournois (GT) interleaver optics and include a beamcombiner cube 332 and at least one GT interferometer 334. The GT interferometer 334 may include a reflector 336 forming a GT cavity between the reflector 336 and the beamcombiner cube 332, which interferometrically combines the reflected light. The length of the GT cavity sets the free spectral range (FSR) of the interleaver optics 330, for example, to match the desired channel spacing. The interleaver optics 330 may also include filter elements 338, 339 that deliver phase or amplitude changes to the light passing through to help tune the filter shape. The optical elements in the interleaver optics 330 may be arranged to allow the combined light 341 to be directed to the output portion of the dual collimator 314 (e.g., the beamcombiner cube 332 and reflector 336 may be slightly angled). The filter elements 338, 339 may also be angled to prevent unintended reflections from the front and rear surfaces. Corrective optics for minimizing in-band insertion loss and dispersive effects due to interleaver imperfections may be included in the output path of the interleaver optics. Examples of other interleaver filter optics that may also be used include Mach-Zender interleaver filter optics and arrayed-waveguide (AWG) router optics.

Figure 4:
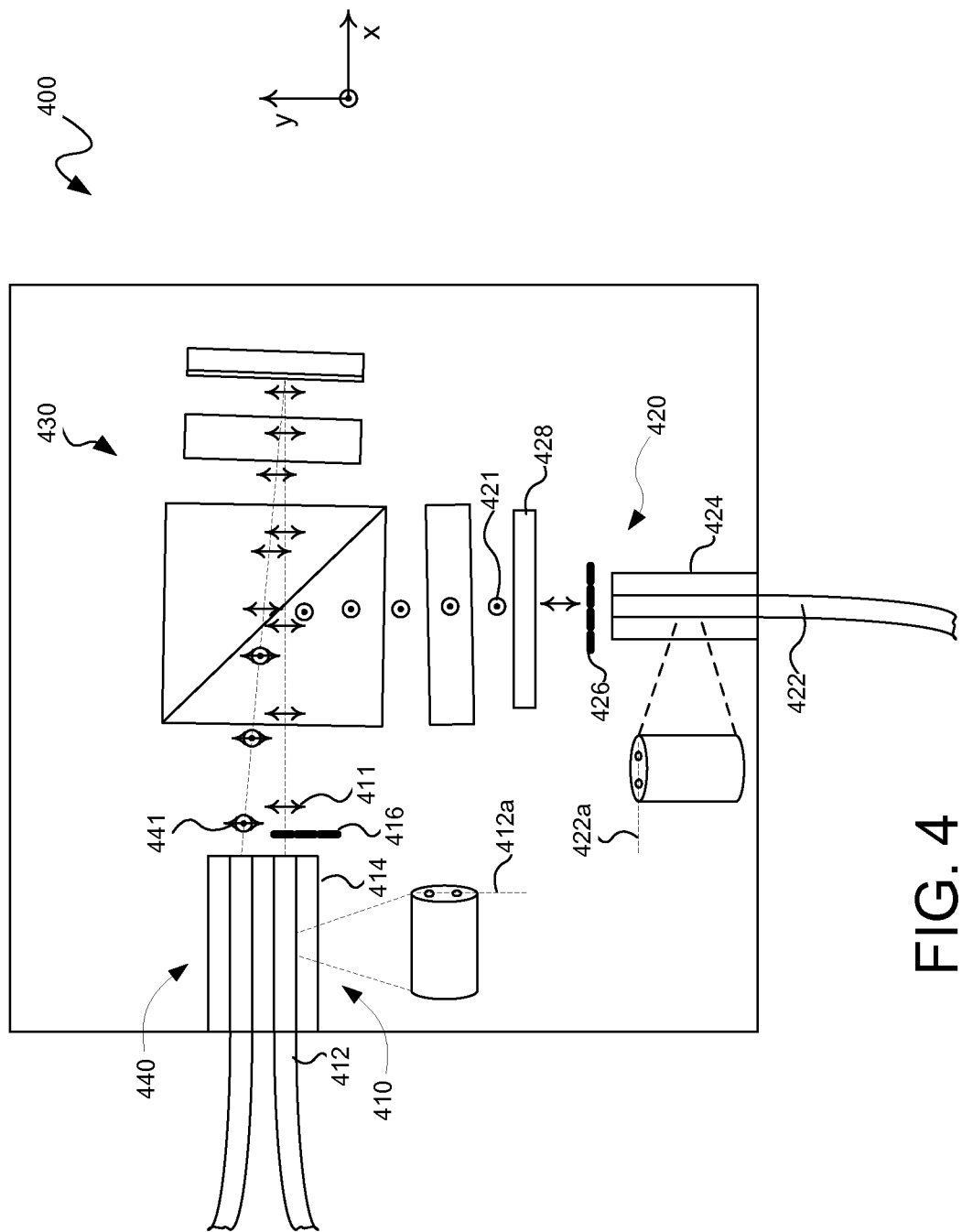
FIG. 4 is a simplified block diagram of another exemplary embodiment of an orthogonally-combining interleaving filter multiplexer consistent with the present disclosure.

Another embodiment of an orthogonally-combining interleaving filter multiplexer 400 is shown in FIG. 4. In this embodiment, the orthogonal polarization is provided by a polarization rotator 428, such as a wave plate, located at one of the optical inputs 410, 420. The optical inputs 410, 420 include PM fibers 412, 422 coupled to collimators 414, 424 with the same alignment relative to a plane of the interleaver optics 430 (i.e., the x-y plane). As shown, for example, the slow axes 412a, 422a of the PM fibers 412, 422 may both be aligned substantially parallel to the x-y plane such that the light exiting the collimators 414, 424 initially has the same polarization substantially parallel to the x-y plane. The polarization rotator 428 then rotates the light 421 from one input 420 to generate a net 90° rotation between the light 421 and the light 411 from the other input 410, thereby resulting in a substantially orthogonal polarization between the light 411 including the odd channel wavelengths and the light 421 including the even channel wavelengths. Similar to the embodiment described above, the interleaver optics 430 then pre-filters and combines the light 411, 421 and directs the combined light 441 to an optical output 440.

Although the polarization rotator 428 is shown at the even channel optical input 420, a polarization rotator may also be located at the odd channel input 410 or polarization rotators may be located at both inputs 410, 420 to provide the net 90° rotation between the light 411 including the odd channel wavelengths and the light 421 including the even channel wavelengths. The optical inputs 410, 420 may also include polarizers 416, 426 after the collimators 414, 424 or in-line polarizers spliced into the PM input fibers 412, 422 to increase the extinction ratio as discussed above.

Accordingly, the orthogonally-combining interleaving filter multiplexer, consistent with the embodiments described herein, simultaneously pre-filters and combines odd channels and even channels with an orthogonal polarization, thereby reducing channel crosstalk in a high spectral efficiency WDM communication system while also reducing the number of PM components and filters in the system.

Consistent with one embodiment, an orthogonally-combining interleaving filter multiplexer includes a first optical input configured to receive a first set of multiplexed wavelengths and to provide the first set of wavelengths with a first polarization and a second optical input configured to receive a second set of multiplexed wavelengths and to provide the second set of wavelengths with a second polarization substantially orthogonal to the first polarization. The orthogonally-combining interleaving filter multiplexer also includes interleaver optics configured to filter and combine the first set of wavelengths having the first polarization and the second set of wavelengths having the second polarization to produce pre-filtered, pair-wise orthogonal aggregate channel wavelengths. The orthogonally-combining interleaving filter multiplexer further includes a combined channel optical output configured to output the pre-filtered, pair-wise orthogonal aggregate channel wavelengths.

Consistent with another embodiment, an optical communication system includes a transmitting terminal configured to transmit a wavelength division multiplexed (WDM) signal on a plurality of optical channels including a first set of channels and a second set of channels. The transmitting terminal includes an orthogonally-combining interleaving filter multiplexer configured to polarize and combine a first set of channel wavelengths with a first polarization and a second set of channel wavelengths with a second polarization substantially orthogonal to the first polarization. The orthogonally-combining interleaving filter multiplexer is also configured to simultaneously pre-filter and combine the first set of channel wavelengths with the first polarization and the second set of channel wavelengths with the second polarization to produce a pre-filtered, pair-wise orthogonal WDM aggregate optical signal. The optical communication system also includes a receiving terminal configured to receive the pre-filtered, pair-wise orthogonal WDM aggregate optical signal on the plurality of optical channels and configured to separate WDM aggregate optical signal into separate optical signals at the channel wavelengths. The optical communication system further includes an optical transmission path coupling the transmitting terminal and the receiving terminal.

Consistent with a further embodiment, line terminating equipment includes: a plurality of odd channel transponders configured to transmit and receive optical signals modulated on odd channel wavelengths; a plurality of even channel transponders configured to transmit and receive optical signals modulated on even channel wavelengths; at least one odd channel wavelength multiplexer configured to combine the optical signals modulated on the odd channel wavelengths after the odd channel transponders to produce an aggregate odd channel optical signal; at least one odd channel wavelength demultiplexer configured to separate the optical signals modulated on the odd channel wavelengths before the odd channel transponders; at least one even channel wavelength multiplexer configured to combine the optical signals modulated on the even channel wavelengths after the even channel transponders to produce an aggregate even channel optical signal; at least one even channel wavelength demultiplexer configured to separate the optical signals modulated on the even channel wavelengths before the even channel transponders; and an orthogonally-combining interleaving filter multiplexer configured to polarize the aggregate odd channel optical signal with a first polarization and to polarize the aggregate even channel optical signal with a second polarization substantially orthogonal to the first polarization, the orthogonally-combining interleaving filter multiplexer also being configured to simultaneously pre-filter and combine the aggregate odd channel optical signal with the first polarization and the aggregate even channel optical signal with the second polarization to produce a pre-filtered, pair-wise orthogonal aggregate optical signal.

Consistent with yet another embodiment, an optical transmission method includes: modulating a plurality of data streams on a first set of channel wavelengths and on a second set of channel wavelengths, respectively, to produce optical signals on respective first and second sets of channels; combining the optical signals on the first set of channels onto a single PM optical path; combining the optical signals on the second set of channels onto a single PM optical path; providing the combined optical signals on the first set of channels with a first polarization; providing the combined optical signals on the second set of channels with a second polarization substantially orthogonal to the first polarization; and simultaneously pre-filtering and combining the optical signals with the first polarization and the optical signals with the second polarization using interleaver optics to produce a pre-filtered, pair-wise orthogonal aggregate optical signal.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An orthogonally-combining interleaving filter multiplexer comprising:
   a first channel optical input comprising a first optical fiber configured to receive a first set of multiplexed wavelengths, said first channel optical input configured to polarize the first set of multiplexed wavelengths with a first polarization and provide the first set of multiplexed wavelengths along a first optical input path extending along a first axis;
   a second channel optical input comprising a second optical fiber different from said first optical fiber, said second optical fiber configured to receive a second set of multiplexed wavelengths, said second channel optical input configured to polarize the second set of multiplexed wavelengths with a second polarization substantially orthogonal to the first polarization and provide the second set of multiplexed wavelengths along a second optical input path extending along a second axis, the second optical input path being generally perpendicular to the first optical input path;
   interleaver optics comprising:
      a beam combiner disposed along the first optical input path and the second optical input path and configured to pass the first set of multiplexed wavelengths and reflect the second set of multiplexed wavelengths;
      a reflector disposed along the first optical input path and configured to receive the first set of multiplexed wavelengths passed by the beam combiner, the reflector being angled at a first angle relative to the first optical input path such that the reflector is configured to reflect the received first set of multiplexed wavelengths along an optical output path extending along a third axis;
      a Gires-Tournois (GT) cavity established between the beam combiner and the reflector,
   wherein the interleaver optics are configured to filter and combine the first set of wavelengths having the first polarization and the second set of wavelengths having the second polarization to produce pre-filtered, pair-wise orthogonal aggregate channel wavelengths along the optical output path;
   a combined channel optical output comprising an output fiber disposed along the optical output path and configured to receive and output the pre-filtered, pair-wise orthogonal aggregate channel wavelengths.

2. The orthogonally-combining interleaving filter multiplexer according to claim 1, wherein the first set of multiplexed wavelengths include odd channel wavelengths and the second set of multiplexed wavelengths include even channel wavelengths.

3. The orthogonally-combining interleaving filter multiplexer according to claim 1, wherein the first optical input and the second optical input are coupled to polarization maintaining (PM) input fibers.

4. The orthogonally-combining interleaving filter multiplexer according to claim 3, wherein the PM input fibers are rotated by about 90 degrees relative to each other at the optical inputs such that the first set of wavelengths and the second set of wavelengths have the first and second polarizations, respectively, after the optical inputs.

5. The orthogonally-combining interleaving filter multiplexer according to claim 3, wherein the PM input fibers are both aligned in the same direction relative to each other at the optical inputs, and wherein at least one of the first and second optical inputs includes a polarization rotator configured to rotate polarization about 90 degrees.

6. The orthogonally-combining interleaving filter multiplexer according to claim 3 wherein the first optical input includes an input polarizer configured to increase a polarization extinction ratio of the first set of wavelengths, and wherein the second optical input includes an input polarizer configured to increase a polarization extinction ratio of the second set of wavelengths.

7. The orthogonally-combining interleaving filter multiplexer according to claim 3, further comprising a dual fiber collimator providing one of the optical inputs and the optical output and a single fiber collimator providing another of the optical inputs.

8. The orthogonally-combining interleaving filter multiplexer according to claim 1, wherein the combined channel optical output includes a PM output fiber.

9. The orthogonally-combining interleaving filter multiplexer according to claim 1, wherein an angle between the first polarization and the second polarization is 90±7 degrees.

10. An optical communication system comprising:
    a transmitting terminal configured to transmit a wavelength division multiplexed (WDM) signal on a plurality of optical channels including a first set of channels and a second set of channels, the transmitting terminal comprising an orthogonally-combining interleaving filter multiplexer configured to receive a first set of channel wavelengths on a first optical fiber and to polarize said first set of channel wavelengths with a first polarization and provide the first set of multiplexed channel wavelengths along a first optical input path extending along a first axis, and to receive a second set of channel wavelengths on a second optical fiber different from said first optical fiber and to polarize said second set of channel wavelengths with a second polarization and provide the second set of multiplexed channel wavelengths along a second optical input path extending along a second axis, the second optical input path being generally perpendicular to the first optical input path, the first and second polarizations being substantially orthogonal to each other, the orthogonally-combining interleaving filter multiplexer comprising interleaver optics comprising:
- a beam combiner disposed along the first optical input path and the second optical input path and configured to pass the first set of multiplexed channel wavelengths and reflect the second set of multiplexed wavelengths;
- a reflector disposed along the first optical input path and configured to receive the first set of multiplexed channel wavelengths passed by the beam combiner, the reflector being angled at a first angle relative to the first optical input path such that the reflector is configured to reflect the received first set of multiplexed channel wavelengths along an optical output path extending along a third axis;
- a Gires-Tournois (GT) cavity established between the beam combiner and the reflector,
- wherein the interleaver optics are configured to simultaneously pre-filter and combine the first set of channel wavelengths with the first polarization and the second set of channel wavelengths with the second polarization to produce a pre-filtered, pair-wise orthogonal WDM aggregate optical signal along the optical output path; and
- a combined channel optical output comprising an output fiber disposed along the optical output path and configured to receive and output the pre-filtered, pair-wise orthogonal aggregate optical signal;
- a receiving terminal optically coupled to the combined channel optical output and configured to receive the pre-filtered, pair-wise orthogonal WDM aggregate optical signal on the plurality of optical channels and configured to separate the WDM aggregate optical signal into separate optical signals at the channel wavelengths; and
- an optical transmission path coupling the transmitting terminal and the receiving terminal.

11. The optical communications system according to claim 10, wherein the first set of multiplexed wavelengths include odd channel wavelengths associated with odd channels and the second set of multiplexed wavelengths include even channel wavelengths associated with even channels.

12. The optical communication system according to claim 11, wherein the transmitting terminal further comprises:
- a plurality of odd channel transmitters configured to modulate data on the odd channel wavelengths to produce optical signals on the odd channels;
- an odd channel wavelength multiplexer configured to combine the optical signals at the odd channel wavelengths to produce an aggregate odd channel optical signal;
- a plurality of even channel transmitters configured to modulate data on the even channel wavelengths to produce optical signals on the even channels; and
- an even channel wavelength multiplexer configured to combine the optical signals at the even channel wavelengths to produce an aggregate even channel optical signal.

13. The optical communication system according to claim 12, wherein the receiving terminal further comprises:
- a deinterleaver configured to separate the WDM signal into the aggregate odd channel signal including the odd channel wavelengths and the aggregate even channel signal including the even channel wavelengths;
- an odd channel wavelength demultiplexer configured to separate the aggregate odd channel signal into separate optical signals at the respective odd channel wavelengths;
- an even channel wavelength demultiplexer configured to separate the aggregate even channel signal into separate optical signals at the respective even channel wavelengths;
- a plurality of odd channel receivers configured to receive and demodulate respective optical signals at the odd channel wavelengths; and
- a plurality of even channel receivers configured to receive and demodulate respective optical signals at the even channel wavelengths.

14. The optical communication system according to claim 10 wherein the orthogonally-combining interleaving filter multiplexer comprises:
- a first optical input configured to receive an aggregate optical signal including a first set of multiplexed wavelengths and to provide the aggregate optical signal with the first polarization;
- a second optical input configured to receive an aggregate optical signal including a second set of multiplexed wavelengths and to provide the aggregate optical signal with the second polarization.

15. The optical communication system according to claim 10, wherein the WDM signal has a spectral efficiency of 0.6 Bit/Hz or 0.8 Bit/Hz.

16. The optical communication system according to claim 10, wherein the WDM signal has a channel spacing of about 33 GHz or 25 GHz.

17. Line terminating equipment comprising:
- a plurality of odd channel transponders configured to transmit and receive optical signals modulated on odd channel wavelengths;
- a plurality of even channel transponders configured to transmit and receive optical signals modulated on even channel wavelengths;
- at least one odd channel wavelength multiplexer configured to combine the optical signals modulated on the odd channel wavelengths after the odd channel transponders to produce an aggregate odd channel optical signal;
- at least one odd channel wavelength demultiplexer configured to separate the optical signals modulated on the odd channel wavelengths before the odd channel transponders;
- at least one even channel wavelength multiplexer configured to combine the optical signals modulated on the even channel wavelengths after the even channel transponders to produce an aggregate even channel optical signal;
- at least one even channel wavelength demultiplexer configured to separate the optical signals modulated on the even channel wavelengths before the even channel transponders; and
- an orthogonally-combining interleaving filter multiplexer configured to receive the aggregate odd channel optical signal on a first optical fiber and to polarize the aggregate odd channel optical signal with a first polarization and provide the aggregate odd channel optical signal along a first optical input path extending along a first axis, and to receive the aggregate even channel optical signal on a second optical fiber different from said first optical fiber and to polarize the aggregate even channel optical signal with a second polarization and provide the aggregate even channel optical signal along a second optical input path extending along a second axis, the second optical input path being generally perpendicular to the first optical input path, the second polarization being substantially orthogonal to the first polarization, the orthogonally-combining interleaving filter multiplexer comprising interleaver optics comprising:
  a beam combiner disposed along the first optical input path and the second optical input path and configured to pass the aggregate odd channel optical signal or the aggregate even channel optical signal and reflect the other of the aggregate odd channel optical signal or the aggregate even channel optical signal;
  a reflector disposed along the first optical input path and configured to receive an optical signal passed by the beam combiner, the reflector being angled at a first angle relative to the first optical input path such that the reflector is configured to reflect the received optical signal along an optical output path extending along a third axis;
  a Gires-Tournois (GT) cavity established between a beam combiner and a reflector,
  wherein the interleaver optics are configured to simultaneously pre-filter and combine the aggregate odd channel optical signal with the first polarization and the aggregate even channel optical signal with the second polarization to produce a pre-filtered, pair-wise orthogonal aggregate optical signal along the optical output path;
  a combined channel optical output comprising an output fiber disposed along the optical output path and configured to receive and output the pre-filtered, pair-wise orthogonal optical signal.

18. The line terminating equipment according to claim 17, wherein the orthogonally-combining interleaving filter multiplexer comprises:
  an odd channel optical input configured to receive the aggregate odd channel optical signal including multiplexed odd channel wavelengths and to provide the aggregate odd channel optical signal with the first polarization;
  an even channel optical input configured to receive the aggregate even channel optical signal including multiplexed even channel wavelengths and to provide the aggregate even channel optical signal with the second polarization; and
  a combined channel optical output configured to output the pre-filtered, pair-wise orthogonal aggregate optical signal.

19. The optical receiver according to claim 17, wherein the odd channel wavelength multiplexer and the even channel wavelength multiplexer are coupled to the orthogonally-combining interleaving filter multiplexer with polarization maintaining (PM) input fibers.

20. The line terminating equipment according to claim 19, wherein the PM input fibers are rotated by about 90 degrees relative to each other at the optical inputs such that the odd channel wavelengths and the even channel wavelengths have the first and second polarizations, respectively, upon exiting the optical inputs.

21. The line terminating equipment according to claim 20 wherein at least one of the odd channel and even channel inputs includes a polarization rotator configured to rotate polarization about 90 degrees.

22. An optical transmission method comprising:
  modulating a plurality of data streams on a first set of channel wavelengths and on a second set of channel wavelengths, respectively, to produce optical signals on respective first and second sets of channels;
  combining the optical signals on the first set of channels onto a single PM optical path;
  combining the optical signals on the second set of channels onto a single PM optical path;
  providing the combined optical signals on the first set of channels on a first optical fiber in an orthogonally-combining interleaving fiber multiplexer;
  providing the combined optical signals on the second set of channels on a second optical fiber different from the first optical fiber in the orthogonally-combining interleaving fiber multiplexer;
  providing the combined optical signals on the first set of channels with a first polarization in the orthogonally-combining interleaving filter multiplexer;
  providing the combined optical signals on the second set of channels with a second polarization substantially orthogonal to the first polarization in the orthogonally-combining interleaving filter multiplexer; and
  simultaneously pre-filtering and combining the optical signals with the first polarization and the optical signals with the second polarization using interleaver optics comprising:
    a first optical fiber configured to provide an optical signal with the first polarization along a first optical input path extending along a first axis;
    a second optical fiber configured to provide an optical signal with the second polarization along a second optical input path extending along a second axis;
    a beam combiner disposed along the first optical input path and the second optical input path and configured to pass the optical signal with the first polarization or the optical signal with the second polarization, and reflect the other of the optical signal with the first polarization or the optical signal with the second polarization;
    a reflector disposed along the first optical input path and configured to receive an optical signal passed by the beam combiner, the reflector being angled at a first angle relative to the first optical input path such that the reflector is configured to reflect the received optical signal along an optical output path extending along a third axis;
    a Gires-Tournois (GT) cavity established between a beam combiner and a reflector in the orthogonally-combining interleaving filter multiplexer to produce a pre-filtered, pair-wise orthogonal aggregate optical signal along the optical output path; and
    a combined channel optical output comprising an output fiber disposed along the optical output path and configured to receive and output the pre-filtered, pair-wise orthogonal optical signal.

23. The optical transmission method according to claim 22, wherein the first set of channel wavelengths include odd channel wavelengths associated with odd channels and the second set of channel wavelengths include even channel wavelengths associated with even channels.

24. The optical transmission method according to claim 22, wherein the pre-filtered, pair-wise orthogonal aggregate optical signal has a spectral efficiency of 0.6 Bit/Hz or 0.8 Bit/Hz.

25. The optical transmission method according to claim 22, wherein the pre-filtered, pair-wise orthogonal aggregate optical signal has a channel spacing of about 33 GHz or 25 GHz.

26. The optical transmission method according to 22, wherein providing the combined optical signals with the first and second polarizations includes passing the optical signals through PM fibers coupled to the interleaver optics with slow axes aligned substantially orthogonally.

27. The optical transmission method according to 22, wherein providing the combined optical signals with the first and second polarizations includes passing at least one of the optical signals through a polarization rotator.

\* \* \* \* \*